US010828572B1

United States Patent
Kalama et al.

(10) Patent No.: US 10,828,572 B1
(45) Date of Patent: Nov. 10, 2020

(54) SYSTEMS AND METHOD FOR DYNAMIC CONTENT UNLOCK AND ADAPTIVE CONTROL

(71) Applicant: Disney Enterprises, Inc., Burbank, CA (US)

(72) Inventors: Asa K. Kalama, Burbank, CA (US); Robert Scott Trowbridge, Burbank, CA (US); Jacqueline E. King, Burbank, CA (US); Robert E. Huebner, Burbank, CA (US); Peter Stepniewicz, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 3 days.

(21) Appl. No.: 16/147,539

(22) Filed: Sep. 28, 2018

Related U.S. Application Data

(60) Provisional application No. 62/610,819, filed on Dec. 27, 2017.

(51) Int. Cl.
*A63F 13/798* (2014.01)
*A63G 31/00* (2006.01)

(52) U.S. Cl.
CPC ............ *A63F 13/798* (2014.09); *A63G 31/00* (2013.01)

(58) Field of Classification Search
CPC .............................. A63F 13/798; A63G 31/00
USPC .......................................................... 463/23
See application file for complete search history.

(56) References Cited

U.S. PATENT DOCUMENTS

| 6,079,982 A * | 6/2000 | Meader | A63F 13/08 434/29 |
| 2002/0018982 A1* | 2/2002 | Conroy | G09B 9/042 434/62 |
| 2006/0293110 A1* | 12/2006 | Mendelsohn | A63G 1/00 472/137 |
| 2007/0010306 A1* | 1/2007 | Kanno | A63F 13/10 463/6 |
| 2008/0188318 A1* | 8/2008 | Piccionelli | A63G 7/00 472/60 |
| 2008/0268943 A1* | 10/2008 | Jacob | G06F 3/04815 463/23 |
| 2009/0125161 A1* | 5/2009 | Baur | G09B 19/16 701/1 |
| 2011/0076649 A1* | 3/2011 | Best | G09B 9/05 434/69 |

(Continued)

*Primary Examiner* — David L Lewis
*Assistant Examiner* — Shauna-Kay Hall
(74) *Attorney, Agent, or Firm* — Kilpatrick Townsend & Stockton LLP

(57) ABSTRACT

Systems and methods for dynamic modification of an amusement ride are disclosed herein. The system can include a simulation vehicle including a plurality of controls and at least one interface, which simulation vehicle can transit at least one passenger through a ride experience from a starting position to a terminating position. The system can include a content presentation system, and a processor. The processor can: provide content to the at least one passenger; identify a user skill level based on a plurality of user inputs received by at least some of the plurality of controls of the simulation vehicle; identify a modification to a difficulty of the ride experience based in part on the identified user skill level; and modify the difficulty of the ride experience according to the identified modification.

21 Claims, 6 Drawing Sheets

(56) References Cited

U.S. PATENT DOCUMENTS

| | | | |
|---|---|---|---|
| 2013/0045804 A1* | 2/2013 | Ruke | A63F 13/79 463/42 |
| 2016/0048203 A1* | 2/2016 | Blum | G06F 3/012 104/84 |
| 2016/0089610 A1* | 3/2016 | Boyle | A63G 25/00 463/7 |
| 2017/0166221 A1* | 6/2017 | Osterman | A63G 25/00 |

* cited by examiner

SYSTEMS AND METHOD FOR DYNAMIC CONTENT UNLOCK AND ADAPTIVE CONTROL

CROSS-REFERENCES TO RELATED APPLICATIONS

This application claims the benefit of U.S. Provisional Application No. 62/610,819, filed on Dec. 27, 2017, and entitled "SYSTEMS AND METHODS FOR DYNAMIC CONTENT UNLOCK AND ADAPTIVE CONTROLS", the entirety of which is hereby incorporated by reference herein.

BACKGROUND

The present disclosure relates generally to management of controls within a gaming environment. Electronic gaming uses controls to receive user inputs to affect a change within the game. These controls can include control sticks, steering wheels, buttons, and/or knobs. By using these controls, the user can interact with the game and cause a desired action within the game. However, the user's skill level at the game affects how the user interacts with controls. Traditionally, skill level has been compensated for via the adjustment of a difficulty level of content presented as part of the electronic game. Such adjustment of the difficulty level of content presented as part of the electronic game may not be possible when the electronic game is in a multiplayer mode. Accordingly, further developments in electronic gaming are desired.

BRIEF SUMMARY

One aspect of the present disclosure relates to a system for dynamic unlock. The system includes: a simulation vehicle that can transit at least one passenger through a ride experience from a starting position to a terminating position, the simulation vehicle including a plurality of controls and at least one interface; a content presentation system; and a processor. The processor can: provide content to the at least one passenger; identify a user skill level based on a plurality of user inputs received by at least some of the plurality of controls of the simulation vehicle; identify a modification to a difficulty of the ride experience based in part on the identified user skill level, which modification affects at least one of: the at least one interface; and at least one of the plurality of controls; and modify the difficulty of the ride experience according to the identified modification.

In some embodiments, the processor can receive user inputs and to affect content provided to the at least one passenger based on the received user inputs. In some embodiments, identifying a modification includes: retrieving at least one modification threshold; and comparing the identified user skill level to the at least one modification threshold. In some embodiments, the modification threshold includes: a first threshold to determine a low skill level; and a second threshold to determine a high skill level.

In some embodiments, the modification includes a change to an operability of at least one of the plurality of controls. In some embodiments, the change to the operability of the at least one of the plurality of controls includes unlocking the at least one of the plurality of controls. In some embodiments, the change to the operability of the at least one of the plurality of controls includes: deactivating the at least one of the plurality of controls; and reassigning functionality of the at least one of the plurality of controls to a second set of controls within the plurality of controls In some embodiments, the processor can determine when the user inputs relate to a critical function. In some embodiments, the at least one of the plurality of controls is deactivated when the user inputs received at the at least one of the plurality of controls are identified as relating to a critical function. In some embodiments, the modification includes a change to a functional feature of the interface to change a difficulty of use of the interface.

One aspect of the present disclosure relates to a method for dynamic unlock. The method includes: providing content to at least one passenger of a simulation vehicle that can transit at least one passenger through a ride experience, the simulation vehicle including a plurality of controls and at least one interface; identifying a user skill level based on a plurality of user inputs received by at least some of the plurality of controls of the simulation vehicle; identifying a modification to a difficulty of the ride experience based in part on the identified user skill level, which modification affects at least one of: the at least one interface; and at least one of the plurality of controls; and modifying the difficulty of the ride experience according to the identified modification.

In some embodiments, the method includes: receiving user inputs; and affecting content provided to the at least one passenger based on the received user inputs. In some embodiments, identifying a modification includes: retrieving at least one modification threshold; and comparing the identified user skill level to the at least one modification threshold. In some embodiments, the modification threshold includes: a first threshold to determine a low skill level; and a second threshold to determine a high skill level. In some embodiments, the modification threshold includes plurality of thresholds between a first threshold corresponding to a low skill level and a second threshold corresponding to a high skill level.

In some embodiments, the modification includes a change to an operability of at least one of the plurality of controls. In some embodiments, the change to the operability of the at least one of the plurality of controls includes unlocking the at least one of the plurality of controls. In some embodiments, the change to the operability of the at least one of the plurality of controls includes: deactivating the at least one of the plurality of controls; and reassigning functionality of the at least one of the plurality of controls to a second set of controls within the plurality of controls In some embodiments, the method includes determining when the user inputs relate to a critical function. In some embodiments, the at least one of the plurality of controls is deactivated when the user inputs received at the at least one of the plurality of controls are identified as relating to a critical function. In some embodiments, the modification includes a change to a functional feature of the interface to change a difficulty of use of the interface.

DETAILED DESCRIPTION OF THE INVENTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

I. Introduction

Electronic gaming has traditionally increased the difficulty of gaming content to compensate for skill level of a player. While this change in gaming content can adequately address the skill level of an individual player, changing of content to match skill level becomes complicated in situations in electronic gaming with multiple players, and specifically in electronic gaming when multiple players are collaborating to complete a mission. In this circumstance, particularly when there is significant difference between the skill levels of the players, the provided content may be too difficult or too easy for one or more of the players. This gap between the skill level and the difficulty can hamper enjoyment of the gaming experience.

In addition to pure electronic gaming, electronic gaming concepts are spilling into other activities such as, for example, simulations or amusement rides. In the case of amusement rides, the combination of aspects of electronic gaming, such as the completion of a mission while on the ride, can enhance passenger experience. However, as multiple passengers may ride in a single simulation vehicle, the difficulty of content cannot be easily adjusted without providing content that is either too difficult or too easy.

Alternative to the changing of content, one or several controls and/or interfaces could be modified to compensate for skill levels. This could include identifying a skill level of a user of a set of controls and then modifying one or several aspects of that set of controls to either increase or decrease the difficulty level for that user. This modification can include, for example, activating or deactivating one or several controls or interfaces, changing the sensitivity of one or several controls or interfaces, changing aspects of one or several interfaces, reassigning controls, or the like. The modification of the set of controls can, in some embodiments, include the providing of a user notifier of the modification. This notifier could include, for example, providing visual feedback, such as illuminating affected controls, indicating the modification, providing tactile feedback, such as vibration of affected controls, indicating the modification, and/or providing audible feedback indicating the modification.

II. Dynamic Unlock System

Figure 1:
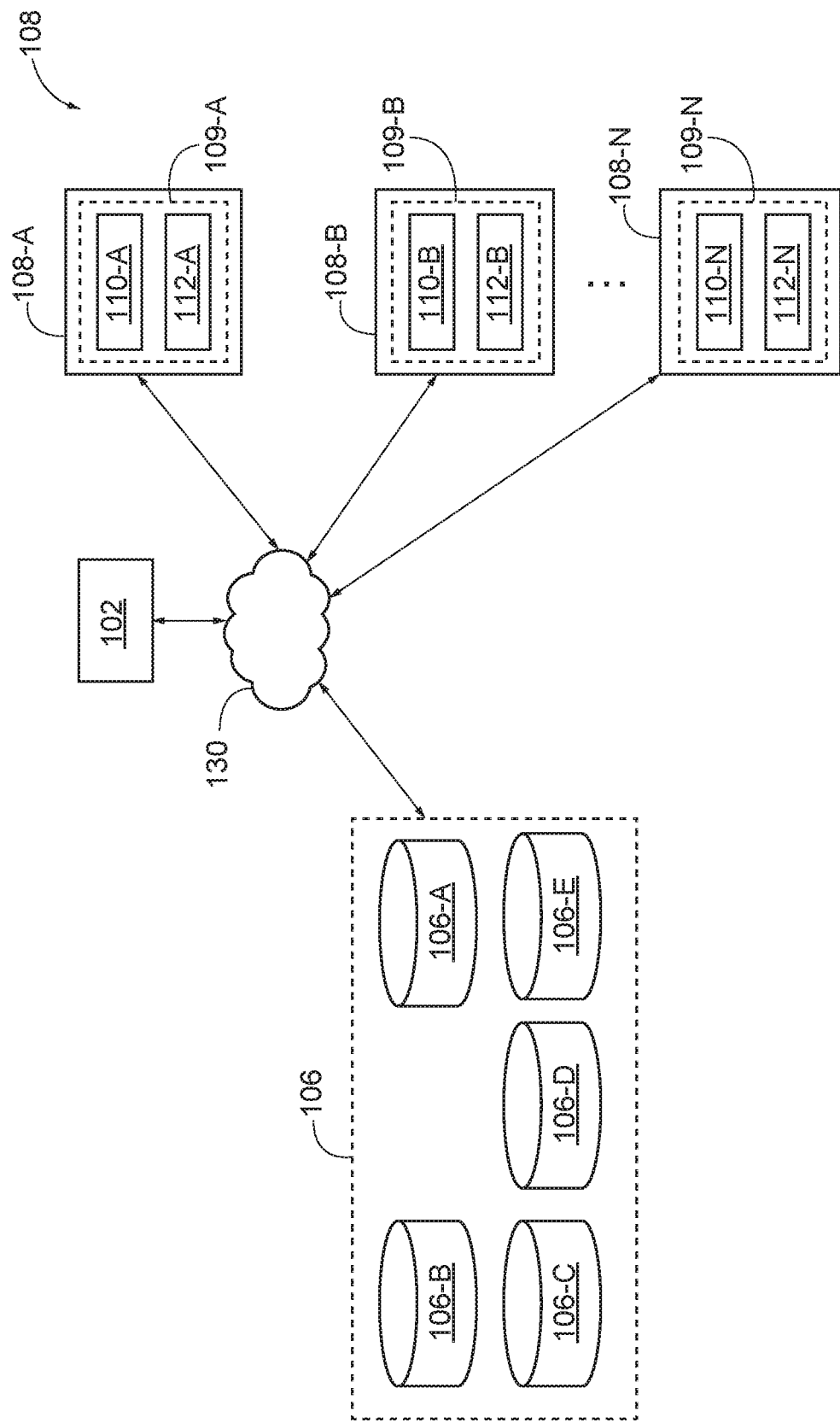
FIG. 1 is a schematic illustration of one embodiment of a system for dynamic unlock.

With reference now to FIG. 1, a schematic illustration of one embodiment of a system 100, also referred to herein as a dynamic unlock system 100, is shown. The system 100 can allow for dynamic unlock or modification of controls, content, and/or interfaces according to a determined skill level of one or several passengers of an amusement ride, and particularly of a simulation vehicle of the amusement ride.

The system 100 can include a processor 102 which can include, for example, one or several processors or servers. The processor 102 can be any computing and/or processing device including, for example, one or several laptops, personal computers, tablets, smartphones, servers, mainframe computers, processors, or the like. The processor 102 can be configured to receive inputs from one or several other components of the system 100, to process the inputs according to one or several stored instructions, and to provide outputs to control the operation of one or several of the other components of the system 100.

The system 100 can include memory 106. The memory 106 can represent one or more storage media and/or memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. The memory 106 can be an integral part of the processor 102 and/or can be separate from the processor 102. In embodiments in which the memory 106 is separate from the processor 102, the memory 106 and the processor 102 can be communicatingly linked via, for example, communications network 130. The communications network 130 can comprise any wired or wireless communication connection between some or all of the components of the system 100.

The memory 106 can include software code and/or instructions for directing the operation of the processor 102 and/or one or several databases 106 containing information used by the processor 102 and/or generated by the processor 102. These databases include, for example, a content database 106-A, a content modification database 106-B, an interface modification database 106-C, a hardware modification database 106-D, also referred to herein as a control modification database 106-D, and a threshold database 106-E.

The content database 106-A can include content for presentation to passengers of the amusement ride. In some embodiments, this content can be for presentation to passengers of the simulation vehicle 108 and can comprise video content, audio content, combined video and audio content, or the like. This content can be in the form of one or several films, movies, shows, simulations, interactive stories, or video games. In some embodiments, this content can include a mission, a storyline, a plot, or narrative that may be dynamic based on received user inputs in that the received user inputs can affect the content.

The content modification database 106-B can include information identifying one or several modifications of the content for presentation to change the difficulty of that content. Such modifications can include, for example, changing the number of actions or opponents for completion of all or a portion of the mission, changing the required speed for completion of the actions or the defeating of opponents, and/or increasing or decreasing the type or skill level of obstacles and/or opponents.

The interface modification database 106-C can include information for implementing one or several modifications of an interface 350. Specifically, this can include information used in implementing one or several modifications to one or several features of the interface, such as one or several visible or audible features of the interface. These modifications to the one or several features of the interface can increase or decrease the difficulty of use of the interface 350. The information in the interface modification database 106-C can be implemented by the processor 102 to apply the modification to the interface.

The hardware modification database 106-D can include information identifying one or several modifications to user controls. These modifications can include, for example, locking or unlocking one or several controls, activating or deactivating one or several controls, and/or reassigning one or several controls. The information in the hardware modification database 106-D can be implemented by the processor 102 to apply the identified modification to the user controls.

The threshold database 106-E can include data identifying one or several thresholds. These thresholds can, in some embodiments, delineate between skill levels such as, for example, between relatively lower or higher skill levels. In some embodiments, some or all of these thresholds can be linked with modifications identified in one of the modification databases 106-B, 106-C, 106-D such that, when a threshold is crossed, a modifications associated with that threshold is identified.

The system 100 can include one or several simulation vehicles 108 including, for example, a first simulation vehicle 108-A, a second simulation vehicle 108-B, and up to and including an N$^{th}$ simulation vehicle 108-N. The simulation vehicle 108 can contain one or several passengers in, for example, a seat, a restraint system, or the like. The simulation vehicle 108 can transport passengers from a starting position to a termination position, which starting position can be the location at which passengers enter the simulation vehicle 108 and which termination position can be the location at which the passengers exit the simulation vehicle 108. In some embodiments, the starting position and the termination position can be co-located.

The simulation vehicle 108 and/or the components thereof can be communicatingly connected with the processor 102. This communication connection can allow the providing of information to the simulation sled 108, which information can control operation of all or portions of the simulation vehicle 108, and which communicating connection can allow the receipt of information from the simulation vehicle 108 by the server 102, which information can include one or several user inputs at the simulation vehicle 108.

The simulation vehicle 108 can include controls 109 that can include a display system 110 and an input system 112. The display system 110 can provide information to the one or several passengers of the simulation vehicle 108 and the input system 112 can receive information from the one or several passengers of the simulation vehicle 108. In some embodiments, each simulation vehicle 108 can include the display system 110 and the input system 112 such that, for example, the first simulation vehicle 108-A can include the first display system 110-A and the first input system 112-A, and the second simulation vehicle 108-B can include the second display system 110-B and the second input system 112-B, up to the N$^{th}$ simulation vehicle 108-N which can include the N$^{th}$ display system 110-N and the N$^{th}$ input system 112-N.

III. Simulation Sled

Figure 2:
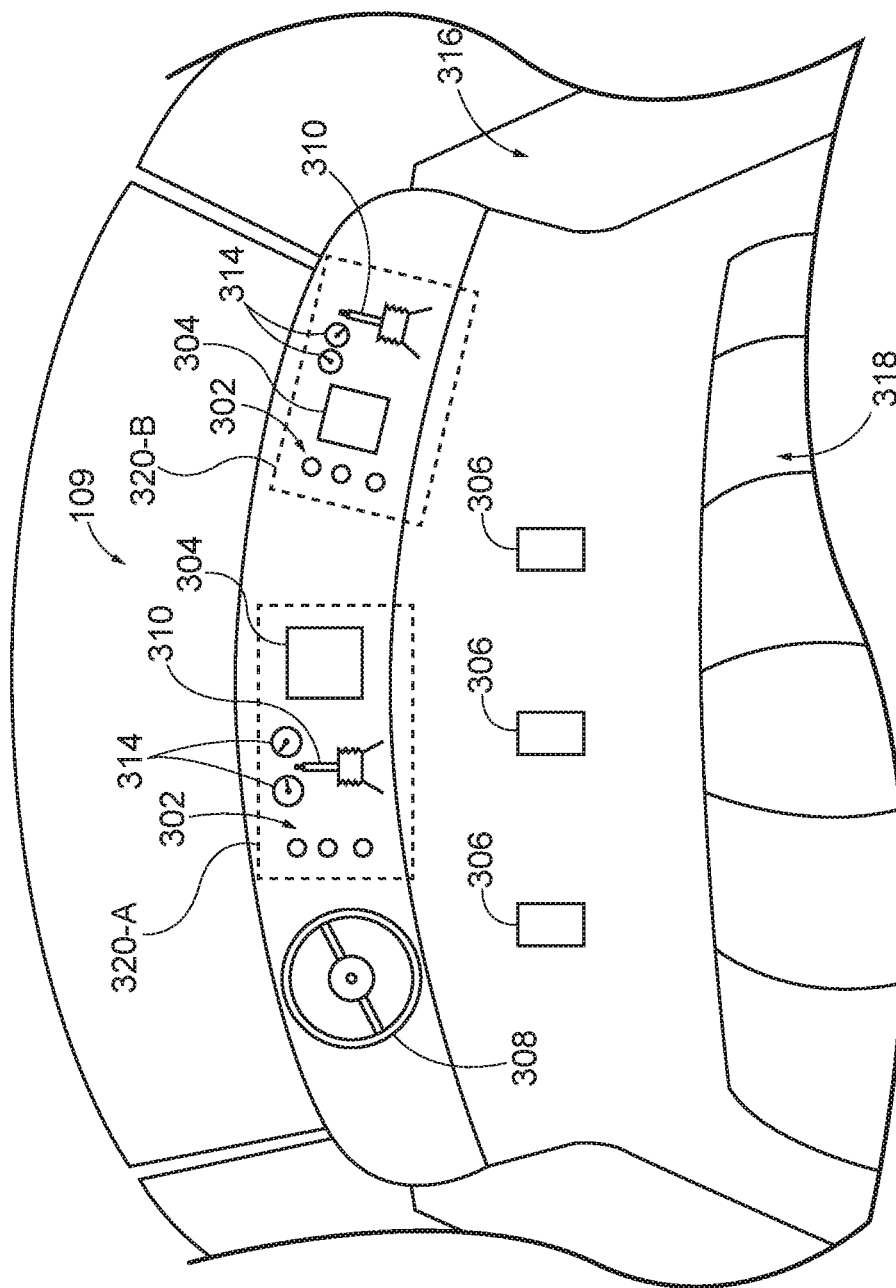
FIG. 2 is an illustration of one embodiment of the passenger area of the simulation vehicle.

With reference now to FIG. 2, an illustration of one embodiment of the passenger area 300 of the simulation vehicle 108 is shown. The simulation vehicle 108 is mounted on the motion base 116 and the simulation vehicle 108 includes controls 109 including the display system features 110 and the input system features 112. The display system features 110 can include, for example, one or several: displays 304, including screens, monitors, touchscreens, or the like; one or several gauges 314, or the like. The input system features 112 can include one or several: buttons 302; pedals 306; steering wheels 308; control sticks 310; or the like. As further seen in FIG. 2, the simulation vehicle 108 can include accommodations 318 which can include a seat, one or several passenger restraints, or the like.

In some embodiments, some or all of the user controls 109 can be redundant so that multiple users can control the same functionality of the simulation vehicle 108 and/or of the simulation, and in some embodiments, some or all of the user controls 112 can be non-redundant so that different users can control different functionality of the simulation vehicle 108. In some embodiments, for example, some or all of the controls 109 can be organized into one or several control sets 320 which, in the embodiment of FIG. 2, includes a first set 320-A and a second set 320-B. Some or all of the controls in the control sets can be redundant so that passengers can perform one or several desired functions with one or both of the first control set 320-A and the second control set 320-B.

Figure 3:
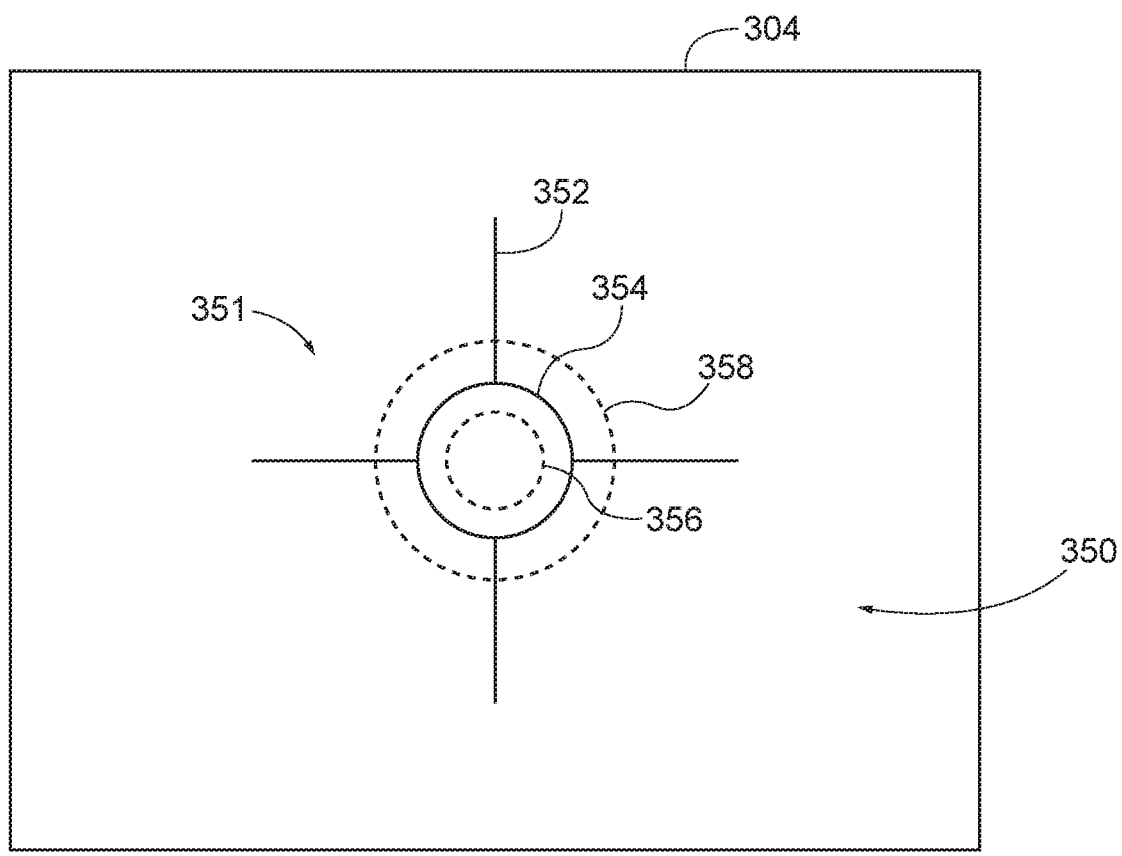
FIG. 3 is a graphical depiction of one embodiment of an interface including an aiming reticle.

In some embodiments, the display system features 110, and specifically the displays 304 can provide an interface 350 viewable or accessible by one or several passengers of the simulation vehicle 108. In some embodiments, the interface can include one or several features 351, also referred to herein as functional features, that can assist a passenger in performing or completing a task. These features can include, for example, an aiming reticle 352, a heads-up display ("HUD"), or the like. The interface 350 can be modified to correspond to a skill level of the passenger. For example, and as depicted in FIG. 3, the reticle 352 can include a base aiming ring 354 that can be modified to either a diminished aiming ring 356 or an expanded aiming ring 358. In some embodiments, for example, the base aiming ring 354 can be modified to the diminished aiming ring 356 when the passenger skill level exceeds a threshold, and the base aiming ring 354 can be modified to the expanded aiming ring 358 when the passenger skill level drops below a threshold. Similarly, the diminished aiming ring 356 can be modified to the base aiming ring 354 when the passenger skill level drops below a threshold and the expanded aiming reticle 358 can be modified to the base aiming ring 354 when the passenger skill level exceeds a threshold.

IV. Methods for Dynamic Unlock

Figure 4:
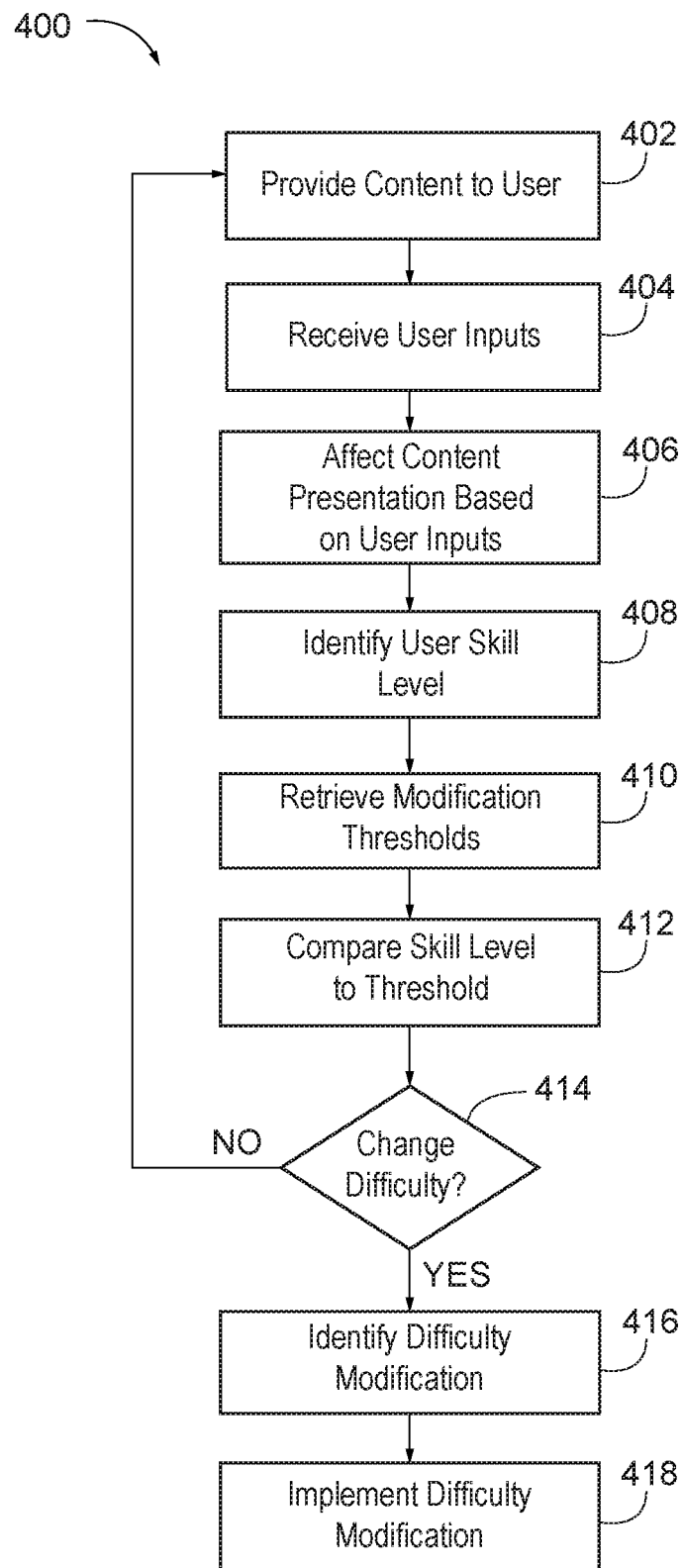
FIG. 4 is a flowchart illustrating one embodiment of a process for dynamic unlock.

FIG. 4 is a flowchart illustrating one embodiment of a process 400 for dynamic unlock. The process 400 can be performed by all or portions of the system 100. The process 400 begins at block 402, wherein content is provided to a passenger of the simulation vehicle 108. The content can be retrieved from the memory 106 and specifically from the content database 106-A by the processor 102 and can be provided to a user or users that can be one or several passengers of the simulation vehicle 108 via, for example, the display system 110 of the simulation vehicle 108. The provided content can comprise all or portions of a mission for completion by the passengers of the simulation vehicle 108 while on the simulation vehicle 108 and/or while riding the amusement ride.

At block 404 of the process 400, one or several user inputs are received. These inputs can be received by the processor 102 from one or several simulation vehicles 108 of the amusement ride. These one or several inputs can be received at the simulation vehicles via the input system 112 of the simulation vehicle 108, and specifically via the user controls 109 of the simulation vehicle 108. The user inputs can be received in response to the content provided in block 402 and the user inputs can affect the providing of content to the user as indicated in block 406. In some embodiments, the content for presentation to the passengers of the simulation vehicle can be modified according to the received user inputs by the processor 102.

At block 408 of the process 400, a skill level of a passenger of the simulation vehicle 108 is determined. In some embodiments, this skill level can be determined based on the passenger's interaction with the provided content, the mission, and/or the controls 109. This skill level can be, for example, based on control of a vehicle, engaging one or more enemies or opponents, completion of objectives of the mission or tasks within the mission, or the like.

The skill level can be determined in aggregate for all passengers within the simulation vehicle 108 or can be determined for an individual passenger within the simulation vehicle 108. In some embodiments, for example, a skill level can be determined or identified for each passenger of the simulation vehicle 108 based on the interaction of each passenger with the provided content, the simulation vehicle 108, and/or some or all of the user controls 109. In some embodiments, for example, a first skill level can be determined for a first passenger using the first set 320-A of controls 109 and a second skill level can be determined for a second passenger using the second set 320-B of controls 109. The skill level can be determined by the processor 102.

At block 410 of the process 400, one or several modification thresholds are retrieved. In some embodiments, some or all of the modification thresholds can delineate between skill levels at which no modification of the content, interface 350, and/or user controls 109 is indicated and skill levels at which modification of the content, interface 350, and/or user controls 109 is indicated. In some embodiments, the one or several modification thresholds can be retrieved by the processor 102 from the memory 106 and specifically from the threshold database 106-E.

At block 412 of the process 400, the user skill level identified in block 408 is compared to a least one of the one or several modification thresholds retrieved in block 410. This comparison can identify whether the user skill level is higher or lower than one or several of modification thresholds and thus whether a modification of the content, interface 350, and/or user controls 109 is indicated. This comparison can be performed by the server 102.

After the skill level has been compared to the at least one of the one or several modification thresholds, the process 400 proceeds to decision block 414 wherein it is determined whether to modify at least one of the content, the interface 350, and/or the user controls 109 to thereby change the difficulty of the amusement ride. This determination can be made by the processor 102 based on the result of the comparison in block 412 of the user skill level to the at least one of the one or several modification thresholds. If it is determined that no modification is indicated, then the process 400 returns to block 402 and proceeds as outlined above.

Returning again to decision block 414, if it is determined that modification is indicated, then the process 400 proceeds to block 416 wherein the difficulty modification is identified.

In some embodiments, this can include identifying which one or several of the content, interface 350, and/or user controls 109 to modify and how to modify that one or several of the content, interface 350, and/or user controls 109. In some embodiments, this can include determining whether to, via the modification, increase or decrease the difficulty of the amusement ride, and the degree of increase or decrease to the difficulty of the amusement ride. These determinations can be made based on the results of the comparison of the skill level to the one or several thresholds in block 412. In some embodiments, a degree to which a skill level exceeds or file blows a threshold can be used to determine the degree of modification and specifically the degree of increase or decrease to the difficulty of the amusement ride. The identification of the modification can be performed by the processor 102.

In some embodiments, the difficulty modification can include a change in the provided content to increase the difficulty of the content, a change to the interface 350 to increase the difficulty of use of the interface, and/or a change to the controls 109 to increase the difficulty of use of the controls 109. In some embodiments, the change to the interface 350 to increase the difficulty of use of the interface 350 can include a change to one of the features 351 of the interface 350 such as, for example, changing a reticle 352 from having a base aiming ring 354 to having a diminished aiming ring 356. In some embodiments, the change to the controls 109 can include activating or unlocking one or several of the controls 109, changing the sensitivity of one or several of the controls, or increasing the number of controls used by the passenger. In some embodiments, a combination of content, interface 350, and controls 109 can be modified to increase the difficulty of the amusement ride for the passenger.

In some embodiments, the difficulty modification can include a change in the provided content to decrease the difficulty of the content, a change to the interface 350 to decrease the difficulty of use of the interface, and/or a change to the controls 109 to decrease the difficulty of use of the controls 109. In some embodiments, the change to the interface 350 to decrease the difficulty of use of the interface 350 can include a change to one of the features 351 of the interface 350 such as, for example, changing a reticle 352 from having a base aiming ring 354 to having an expanded aiming ring 358. In some embodiments, the change to the controls 109 can include deactivating or locking one or several of the controls 109, changing the sensitivity of one or several of the controls, or decreasing the number of controls used by the passenger. In some embodiments, a combination of content, interface 350, and controls 109 can be modified to decrease the difficulty of the amusement ride for the passenger.

At block 418 of the process 400, the identified modification is implemented. In some embodiments this can include modifying content provided to the passenger, modifying at least one interface 350 with which the passenger interacts, and/or modifying some or all of the controls 109 with which the passenger provides inputs to the simulation vehicle. In some embodiments, the implementation of the modification can be accompanied by one or several indicators provided to the passenger. These one or several indicators can notify the passenger of the modification, and these one or several indicators can include a visual indicator, a tactile indicator, and/or an audible indicator.

Figure 5:
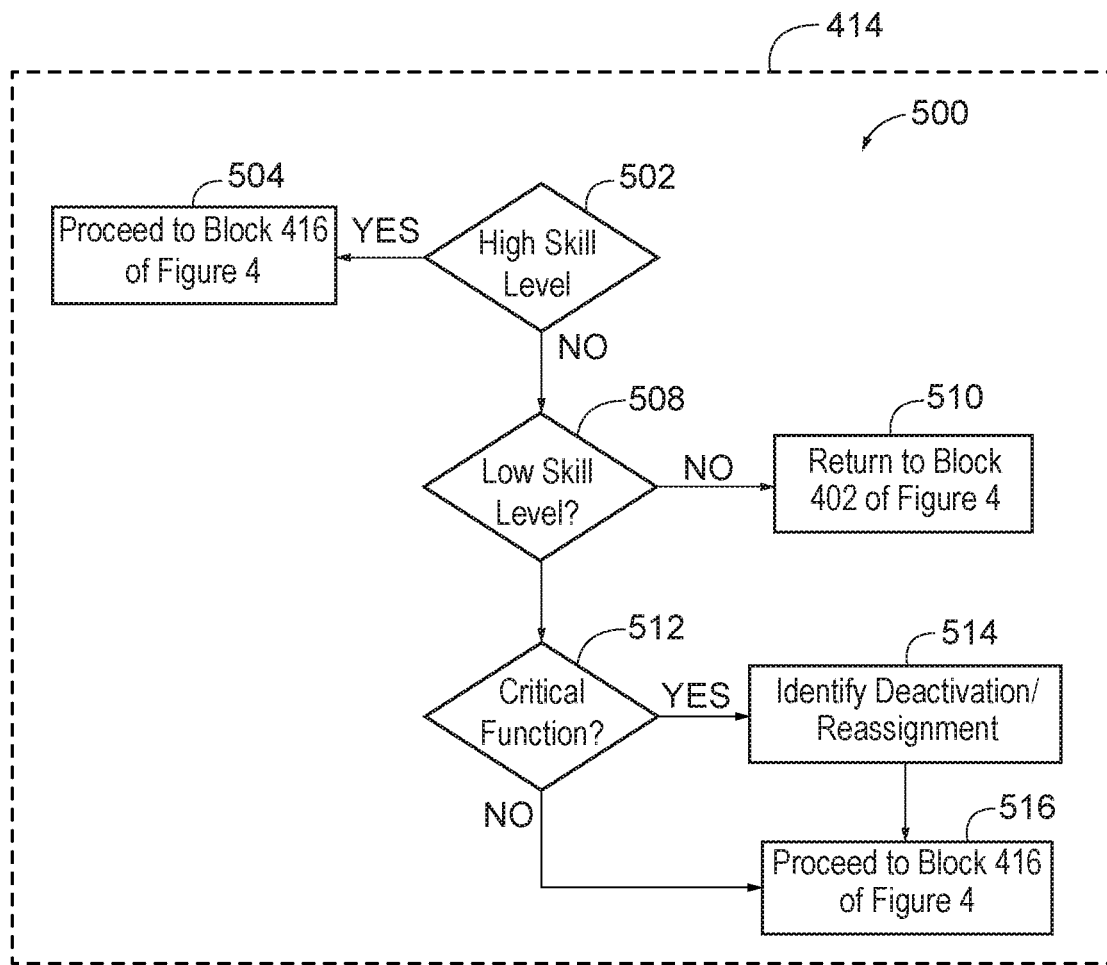
FIG. 5 is a flowchart illustrating one embodiment of a process for determining modification of at least one of: the content, the interface, and/or the user controls.

With reference now to FIG. 5, a flowchart illustrating one embodiment of a process 500 for determining whether to modify at least one of the content, the interface 350, and/or the user controls 109 is shown. The process 500 can be performed in the place of, or as a part of the determination of decision block 414 shown in FIG. 4. The process 500 can be performed by the processor 102.

The process 500 begins at decision block 500 to wherein it is determined if a modification is indicated because the passenger skill level is higher than a modification threshold indicative of an elevated skill level. This determination can be made by the processor 102, and in some embodiments, this can include the determination that the amusement ride as currently configured is too easy for the passenger. This determination can be made based on the result of the comparison of the passenger skill level to the modification thresholds as indicated in step 412 of FIG. 4. If it is determined that the passenger skill level is sufficiently high to warrant a modification to increase the difficulty of the amusement ride for that passenger, then the process 500 proceeds to block 504 and advances to block 416 of FIG. 4 wherein a modification to increase the difficulty of the amusement ride is identified as discussed above.

Returning again to decision block 502, if it is determined that the passenger skill level is not higher than the modification threshold indicative of the elevated skill level, then the process 500 proceeds decision block 508 wherein it is determined if the passenger skill level is lower than modification threshold indicative of a diminished skill level. This determination can be made by the processor 102 and can include the determination that the amusement ride as currently configured is too difficult for the passenger. This determination can be made based on the result of the comparison of the passenger skill level to the modification thresholds as indicated in step 412 of FIG. 4. If it is determined that the user skill level is not less than the modification threshold indicative of the diminished skill level, then the process 500 proceeds to block 510 and returns to block 402 of FIG. 4 and proceeds as outlined above. If the skill level of the passenger is not sufficiently high to warrant modification to increase difficulty and is not sufficiently low to warrant modification to decrease difficulty, then the amusement ride remains or can remain unmodified and content can continue to be provided to the passenger according to the process 400 of FIG. 4 until the amusement ride ends or until the passenger skill level exceeds or drops below a modification threshold.

Returning again to decision block 508, if it is determined that the user skill level is less than the modification threshold indicative of the diminished skill level, then the process 500 proceeds to decision block 512 wherein it is determined if the function for which the passenger is demonstrating a low skill level is a critical function. In some embodiments, for example, one or several tasks performed by passengers of the simulation vehicle 108 via inputs to the user controls 109 can be identified as important or critical. This identification can be stored in the memory 106 and specifically in the content database 106-A. In some embodiments, this determination of whether the function for which the passenger is demonstrating a low skill level is critical by the processor 102. In making this determination, the processor 102 can query the memory for information relating to the function for which the passenger is demonstrating a low skill level, and the processor 102 can receive information from the memory 106, which information can indicate whether the function for which the passenger has a low skill level is critical.

If the function is critical, then the process 500 can proceed to block 514 wherein the deactivation of one or several of the user controls 109 is identified and/or wherein reassignment of the critical function is identified. In some embodiments, the critical function can be protected by deactivating the controls with which the passenger is performing the function and/or by enabling the processor 102 to automatically perform the function such as, for example, via an autopilot or autopilot like feature or capability. In some embodiments, the critical function can be protected by reassignment of the critical function to another passenger in the simulation vehicle 108. In some embodiments, this reassignment can be made to another passenger of the simulation vehicle 108 based on the skill level of this other passenger and can include deactivating one or several controls 109 used by the first passenger in performing this function and activating one or several controls 109 with which the second passenger is to perform this function. In some embodiments, this can include deactivating some or all of the controls 109 in the first set 320-A of controls and the activating of some or all of the controls 109 in the second set 320-B of controls.

After deactivation and/or reassignment has been identified, or returning to decision block 512, if it is determined that the function for which the user has a low skill level is noncritical, then the process 500 proceeds to block 516 and continues to block 416 of FIG. 4, wherein a modification based on the low skill level and/or the criticality of the function associated with the skill level is determined. In embodiments in which the function is critical, the modification can include the deactivation and/or reassignment identified in block 514, whereas in embodiments in which the function is noncritical, the modification might not include deactivation and/or reassignment as identified in block 514.

V. Computer System

Figure 6:
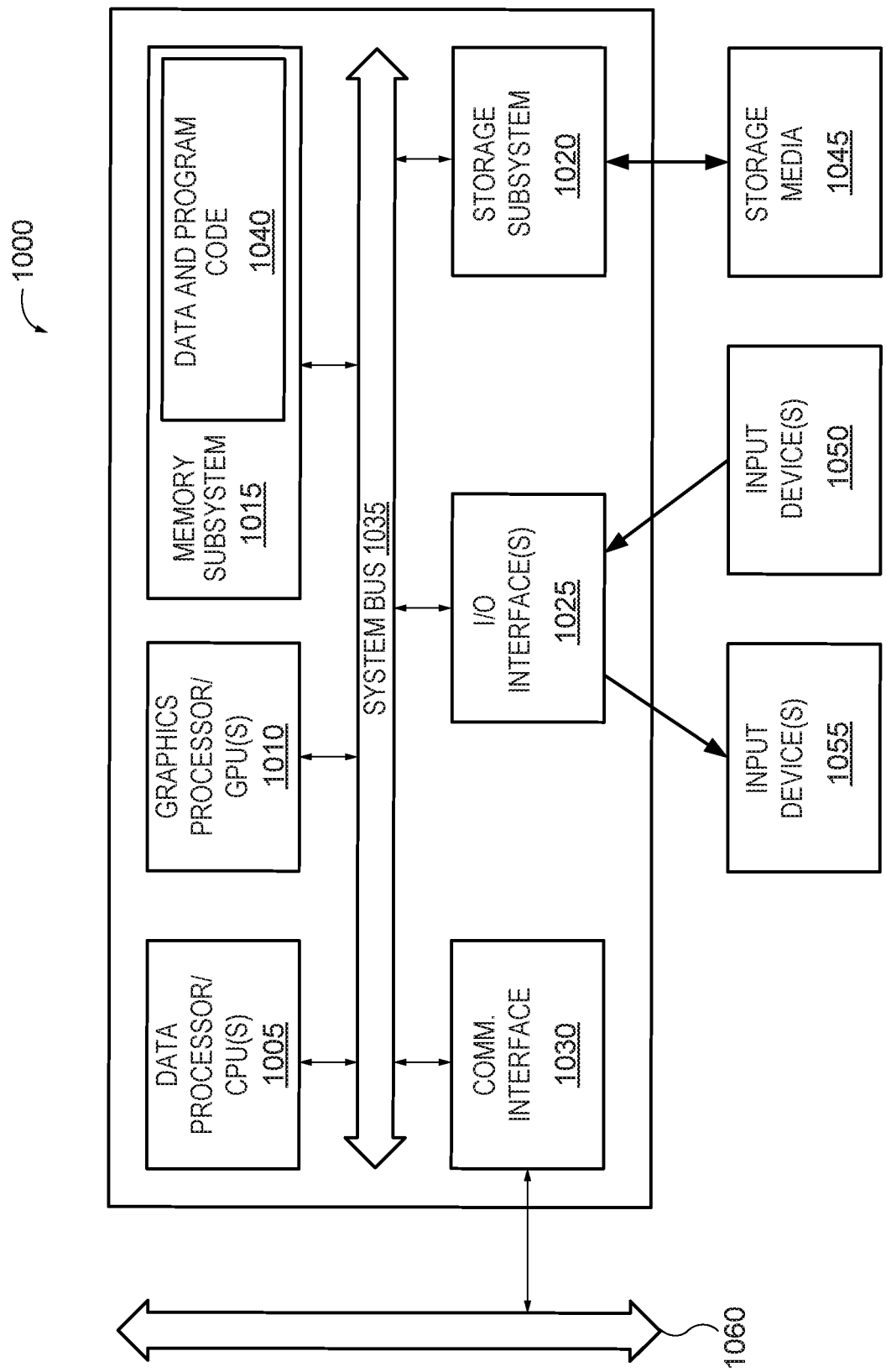
FIG. 6 is a block diagram of a computer system or information processing device that may incorporate an embodiment, be incorporated into an embodiment, or be used to practice any of the innovations, embodiments, and/or examples found within this disclosure.

FIG. 6 shows a block diagram of computer system 1000 that is an exemplary embodiment of the processor 102 and can be used to implement methods and processes disclosed herein. FIG. 7 is merely illustrative. Computer system 1000 may include familiar computer components, such as one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication.

The one or more data processors or central processing units (CPUs) 1005 execute program code to implement the processes described herein. The one or more graphics processor or graphical processing units (GPUs) 1010 execute logic or program code associated with graphics or for providing graphics-specific functionality. Memory subsystem 1015 can store information, e.g., using machine-readable articles, information storage devices, or computer-readable storage media. Storage subsystem 1020 can also store information using machine-readable articles, information storage devices, or computer-readable storage media. Storage subsystem 1020 may store information using storage media 1045 that can be any desired storage media.

The one or more input/output (I/O) interfaces 1025 can perform I/O operations and the one or more output devices 1055 can output information to one or more destinations for computer system 1000. One or more input devices 1050 and/or one or more output devices 1055 may be communicatively coupled to the one or more I/O interfaces 1025. The one or more input devices 1050 can receive information from one or more sources for computer system 1000. The one or more output devices 1055 may allow a user of computer system 1000 to view objects, icons, text, user interface widgets, or other user interface elements.

Communications interface 1030 can perform communications operations, including sending and receiving data. Communications interface 1030 may be coupled to communications network/external bus 1060, such as a computer network, a USB hub, or the like. A computer system can include a plurality of the same components or subsystems, e.g., connected together by communications interface 1030 or by an internal interface.

Computer system 1000 may also include one or more applications (e.g., software components or functions) to be executed by a processor to execute, perform, or otherwise implement techniques disclosed herein. These applications may be embodied as data and program code 1040. Such applications may also be encoded and transmitted using carrier signals adapted for transmission via wired, optical, and/or wireless networks conforming to a variety of protocols, including the Internet.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A system for dynamic unlock, the system comprising:
    a simulation vehicle configured to transit at least one passenger through a ride experience from a starting position to a terminating position, the simulation vehicle comprising a plurality of controls and at least one interface, the at least one interface comprising at least one functional feature;
    a content presentation system; and
    a processor configured to:
        provide content to the at least one passenger;
        identify a user skill level based on a plurality of user inputs received by at least some of the plurality of controls of the simulation vehicle;
        identify a modification to a difficulty of the ride experience based in part on the identified user skill level, wherein the modification affects the at least one interface and at least one of the plurality of controls; and
        modify the difficulty of the ride experience according to the identified modification.

2. The system of claim 1, wherein the processor is further configured to receive user inputs and to affect content provided to the at least one passenger based on the received user inputs.

3. The system of claim 2, wherein identifying a modification comprises: retrieving at least one modification threshold; and comparing the identified user skill level to the at least one modification threshold.

4. The system of claim 3, wherein the modification threshold comprises: a first threshold to determine a low skill level; and a second threshold to determine a high skill level.

5. The system of claim 1, wherein the modification comprises a change to an operability of at least one of the plurality of controls.

6. The system of claim 5, wherein the change to the operability of the at least one of the plurality of controls comprises unlocking the at least one of the plurality of controls.

7. The system of claim 5, wherein the change to the operability of the at least one of the plurality of controls comprises: deactivating the at least one of the plurality of controls; and reassigning functionality of the at least one of the plurality of controls to a second set of controls within the plurality of controls.

8. The system of claim 7, wherein the processor is configured to determine when the user inputs relate to a critical function.

9. The system of claim 8, wherein the at least one of the plurality of controls is deactivated when the user inputs received at the at least one of the plurality of controls are identified as relating to a critical function.

10. The system of claim 1, wherein the modification comprises a change to a functional feature of the interface to change a difficulty of use of the interface.

11. A method for dynamic unlock, the method comprising:
    providing content to at least one passenger of a simulation vehicle configured to transit at least one passenger through a ride experience, the simulation vehicle comprising a plurality of controls and at least one interface, the at least one interface comprising at least one functional feature;
    identifying a user skill level based on a plurality of user inputs received by at least some of the plurality of controls of the simulation vehicle;
    identifying a modification to a difficulty of the ride experience based in part on the identified user skill level, wherein the modification affects the at least one interface and at least one of the plurality of controls; and
    modifying the difficulty of the ride experience according to the identified modification.

12. The method of claim 11, further comprising: receiving user inputs; and affecting content provided to the at least one passenger based on the received user inputs.

13. The method of claim 12, wherein identifying a modification comprises: retrieving at least one modification threshold; and comparing the identified user skill level to the at least one modification threshold.

14. The method of claim 13, wherein the modification threshold comprises: a first threshold to determine a low skill level; and a second threshold to determine a high skill level.

15. The method of claim 13, wherein the modification threshold comprises plurality of thresholds between a first threshold corresponding to a low skill level and a second threshold corresponding to a high skill level.

16. The method of claim 11, wherein the modification comprises a change to an operability of at least one of the plurality of controls.

17. The method of claim 16, wherein the change to the operability of the at least one of the plurality of controls comprises unlocking the at least one of the plurality of controls.

18. The method of claim 16, wherein the change to the operability of the at least one of the plurality of controls comprises: deactivating the at least one of the plurality of controls; and reassigning functionality of the at least one of the plurality of controls to a second set of controls within the plurality of controls.

19. The method of claim 18, further comprising determining when the user inputs relate to a critical function.

20. The method of claim 19, wherein the at least one of the plurality of controls is deactivated when the user inputs received at the at least one of the plurality of controls are identified as relating to a critical function.

21. The method of claim 11, wherein the modification comprises a change to a functional feature of the interface to change a difficulty of use of the interface.

* * * * *